United States Patent [19]

Shore et al.

[11] 4,004,660

[45] Jan. 25, 1977

[54] CONTROL SYSTEM FOR HYDROKINETIC BRAKES

[75] Inventors: Anthony G. L. Shore; Kevin S. Preston, both of Derby; David A. Churchill, Warwickshire, all of England

[73] Assignee: British Railways Board, London, England

[22] Filed: June 27, 1975

[21] Appl. No.: 590,909

Related U.S. Application Data

[63] Continuation of Ser. No. 425,761, Dec. 18, 1973, abandoned, which is a continuation-in-part of Ser. No. 106,163, Jan. 13, 1971, abandoned.

[52] U.S. Cl. .................................. 188/271; 60/357; 192/3.23; 188/296
[51] Int. Cl.² .......................................... F16D 63/00
[58] Field of Search ............ 188/271, 296; 60/347, 60/357; 73/134; 192/3.21, 3.23, 3.34

[56] References Cited

UNITED STATES PATENTS

| | | | |
|---|---|---|---|
| 1,985,889 | 1/1935 | DeLaMater et al. | 188/296 |
| 2,267,852 | 12/1941 | Walker | 188/296 |
| 2,425,171 | 8/1947 | Bennett et al. | 188/296 |
| 2,870,875 | 1/1959 | Cline | 188/296 X |
| 3,051,273 | 8/1962 | Cordiano et al. | 188/296 X |
| 3,334,711 | 8/1967 | Anderson | 188/271 |
| 3,650,358 | 3/1972 | Bessiere | 188/296 |

FOREIGN PATENTS OR APPLICATIONS

| | | | |
|---|---|---|---|
| 162,583 | 4/1955 | Australia | 188/296 |
| 1,213,270 | 3/1966 | Germany | 188/296 |

Primary Examiner—Trygve M. Blix
Attorney, Agent, or Firm—Pollock, Vande Sande & Priddy

[57] ABSTRACT

A control system for a hydrokinetic brake has a pressurized working fluid reservoir connected to the hydrokinetic brake by fluid feed and return lines. A regulating valve sets the pressure in the reservoir at a value related to a required braking torque. The inlet pressure of the hydrokinetic brake is maintained at a fixed value lower than the reservoir pressure, for example by an atmosphere vent, during normal braking operation so that the outlet pressure of the brake and hence the braking torque has a direct relationship with the reservoir pressure, irrespective of the rotational speed of the brake.

10 Claims, 7 Drawing Figures

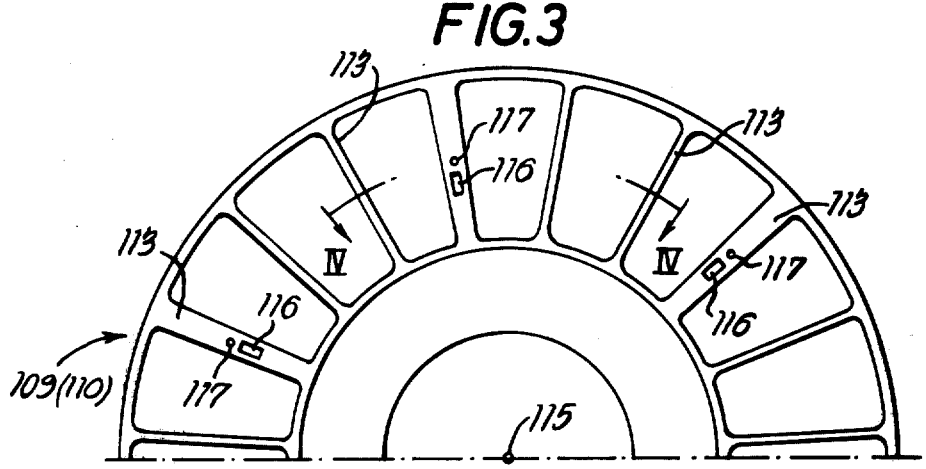
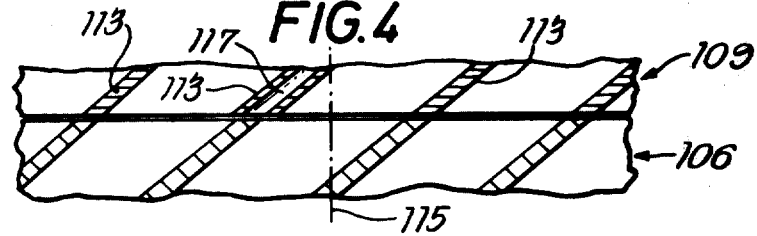
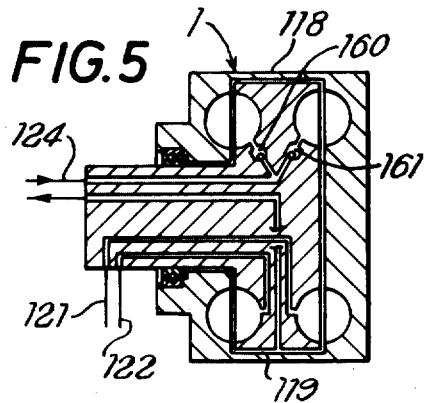

CONTROL SYSTEM FOR HYDROKINETIC BRAKES

This application is a continuation of our earlier application No. 425,761 filed Dec. 18, 1973 and now abandoned, which was a continuation-in-part of our earlier application No. 106,163 filed Jan. 13, 1971 and also now abandoned.

The invention relates to control systems for hydrokinetic brakes and more particularly, but not exclusively, for hydrokinetic brakes used on railway vehicles.

The object of this invention is to provide an extremely simple yet effective hydrokinetic brake control system enabling hydrokinetic brakes to produce a range of braking torques corresponding to a range of braking torque demand signals.

According to this invention there is provided a control system for a hydrokinetic brake comprising a pressurised working liquid reservoir connected to the hydrokinetic brake by feed and return lines, regulating means arranged to set the pressure in the reservoir at a value related to a required braking torque and means controlling the inlet pressure of the hydrokinetic brake so that it is maintained at a fixed value lower than the reservoir pressure during normal braking operation.

The inlet of the hydrokinetic brake may be vented to atmosphere in order to maintain said fixed pressure.

Since the feed line to the brake presents a fixed restriction to liquid flow, the liquid flow to the brake is dependent upon the set reservoir pressure supply and is independent of the speed of rotor rotation. The return line from the brake to the pressure reservoir also presents a fixed restriction to flow and thus, ignoring transients, the pressure developed at the exit from the brake will during normal braking operation stabilise at a pressure which will cause the flow out of the brake to equal the flow into the brake. Therefore, by controlling the reservoir pressure it is possible to control the brake outlet pressure which is proportional to braking torque.

As is well known, at low speeds a hydrokinetic brake is not efficient and the toroid of the brake becomes completely filled with the working liquid and the outlet pressure of the brake falls and with it the braking torque. Also the vent to atmosphere at the inlet of the brake will become closed by working liquid and develop a fluid pressure so that under these abnormal operating conditions the inlet pressure of the brake will rise by substantially the same amount that the outlet pressure falls. Under these abnormal conditions it is advantageous to bring into operation mechanical braking means to supplement the braking torque provided by the hydrokinetic brake using one of the aforesaid varying pressures as the control parameter.

In further embodiment an arrangement may be provided for comparing the pressure at the outlet of the hydrokinetic brake or at some fixed point in the return line with the set reservoir pressure, control means being arranged to cause application of mechanical braking means in response to the ratio of the compared pressures reaching a predetermined value as a result of the value of said outlet pressure falling.

As alternatives, arrangements may be provided for comparing the pressure at a fixed point in the feed line to the hydrokinetic brake or in the vent lines with with set reservoir pressure, control means being arranged to cause application of mechanical braking means in response to the ratio of the compared pressures reaching a predetermined value as a result of the pressure at said fixed point rising.

Said mechanical braking means may be controlled to apply an increasing braking torque as the ratio of the compared pressure continues to vary beyond said predetermined value. Thus it may be arranged that the torque produced by the mechanical braking means will be equal to the amount by which the torque produced by the hydrokinetic brake under the abnormal operating conditions falls below the required braking torque.

The invention will now be further explained by way of example with reference to the accompanying drawings in which:

FIGS. 3 and 4 are fragmentary views showing the stator and rotor constructions of the hydrokinetic brake, FIG. 4 being a section on the line IV—IV of FIG. 3.

FIG. 5 shows a modified form of hydrokinetic brake assembly.

Figure 1:
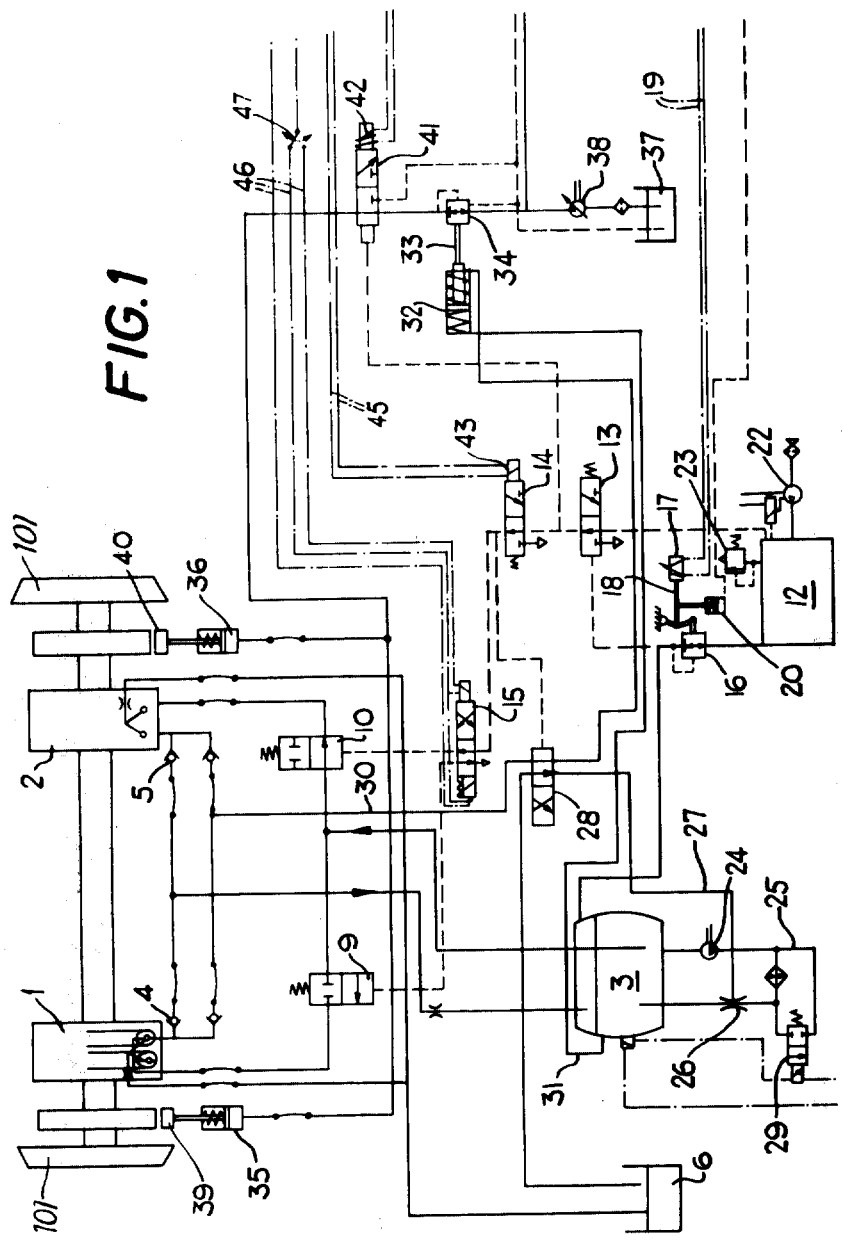
FIG. 1 shows a circuit diagram of one example of control system in accordance with the invention.
Figure 2:
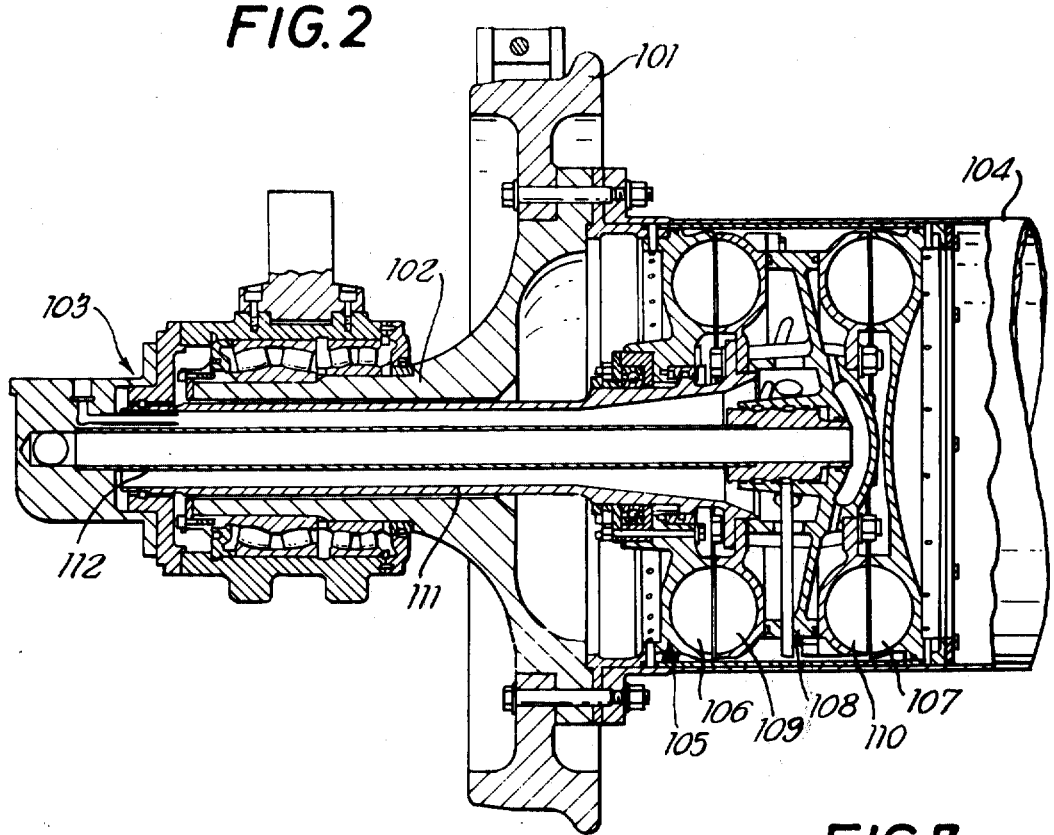
FIG. 2 shows one mechanical arrangement for mounting the hydrokinetic brake on a wheelset of a railway vehicle.

Referring now to FIGS. 1 and 2 of the drawings, a pair of hydrokinetic brakes 1 and 2 are shown mounted on a wheelset axle of a railway vehicle, brake 1 being used during travel in one direction, and brake 2 during travel in the opposite direction. As is already known, the braking efficiency of a hydrokinetic brake can be improved if the planes of the rotor and stator vanes, rather than being parallel to the axis of rotation of the rotor, are inclined to the axis of rotation so that for the given direction of rotation the open mouths of the rotor pockets defined by the rotor vanes are forwardly facing and the open mouths of the associated stator pockets are rearwardly facing. However there is then a significant decrease in braking efficiency for the opposite direction of rotation. For example a brake the planes of whose vanes are inclined at 40° to the axis of rotation will have a braking efficiency for one direction of rotation about 4.3 times that of a brake the planes of whose vanes are parallel to the axis of rotation, but for the reverse direction will have an efficiency of only about 0.2 times that of a brake the planes of whose vanes are parallel to the axis of rotation. It is therefore necessary to have the two brakes 1 and 2, the planes of the rotor and stator vanes of the brake 1 being inclined oppositely to the planes of the rotor and stator vanes of the brake 2 so that one brake is efficient for one direction of rotation and the other brake for the other direction of rotation.

Referring more particularly to the constructional arrangement of FIG. 2, the wheelset has wheels 101 with hollow stub axles 102 through which the wheels 101 are rotatably supported in axle boxes 103. The wheels 101 are interconnected by a large diameter axle tube 104 which is bolted to the wheels 101. Each of the brakes 1 and 2 comprises a double toroid brake having a rotor assembly 105 providing two rotors 106 and 107 and a stator assembly 108 providing two stators 109 and 110. Thus the double toroid brake comprises in effect two hydrokinetic brakes mounted back to back.

The hydrokinetic brakes 1 and 2 are housed within the axle tube 104. The rotor assembly 105 is secured to the hollow axle tube 104 and supports the stator assembly 108 through ball bearings. The stator assembly 108 is connected to the adjacent axle box 103 through tube 111 which thus acts as a torque reaction tube during a braking operation.

Figure 6:
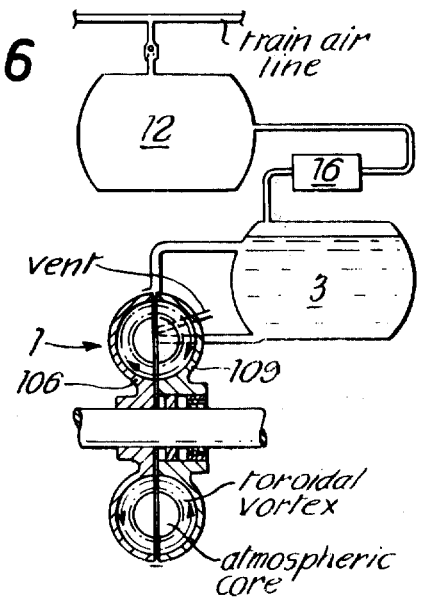
FIG. 6 is a diagrammatic view of the hydrokinetic brake and its associated control system.

Co-axial with the tube 111 is an inner tube 112. Supply of working fluid to the brake is along the annular space between the tubes 111 and 112. Working fluid from the brake passes along the inner tube 112. Appropriate connectors are provided on the axle box for the connection of flexible hoses for carrying fluid to and from the pressurised reservoir 3 (FIGS. 1 and 6).

The stator and rotor constructions can be appreciated from FIGS. 3 and 4. Each of the stators 109 and 110 is provided with radial vanes 113 forming a series of pockets 114. For reasons of brake efficiency as previously explained the planes of the vanes 113 are inclined at about 40° to the axis of rotation 115 of the rotor as can be appreciated from FIG. 4. The rotors 106 and 107 have an inclined vane arrangement similar to the vane arrangement of the stators 109 and 110. Each stator faces its associated rotor as shown in FIG. 4 to form a complete toroid.

From the annular space between the tubes 111 and 112 working fluid is fed through appropriate passages in the stator assembly and then via ducts in the stator vanes to the inlets 116 (FIG. 3) at the centres of the toroids. The outer peripheries of the toroids are appropriately connected via passages in the stator assembly to the inner tube 112. Further ducts 117 pass through certain of the stator vanes 113 to the centres of the toroids to vent the centres of the toroids and in effect the adjacent inlets 116 for the purpose to be described. For example, vanes symmetrically spaced about axis 115 may be ducted to provide the inlets 116 and vents 117.

Instead of using two brakes 1 and 2 as described above a single brake, e.g. brake 1 could be used, provided that the rotor and stator vanes of one of the two toroids were inclined oppositely to those of the other toroid, so that one of the toroids was efficient for one direction of rotation and the other for the opposite direction of rotation and providing that the internal fluid supply and fluid outlet ducts were appropriately arranged for example as will be described in more detail with reference to FIG. 5.

Figure 7:
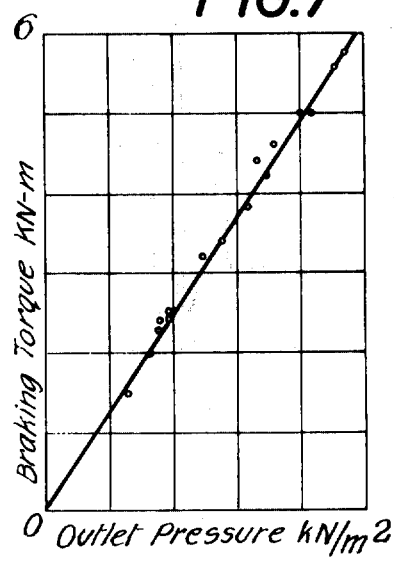
FIG. 7 is a graph of experimental results showing the relationship between brake outlet pressure and braking torque.

Referring more particularly to FIGS. 1, 6 and 7 the control system for the hydrokinetic braking arrangement will now be described.

The supply of working fluid (e.g., oil or water) to the brakes 1 and 2 is from pressurised reservoir 3. The brakes 1 and 2 act as pumps to return the working fluid to the reservoir 3. In the return line from the brakes 1 and 2 are non-return valves 4 and 5 which prevent flow from one brake into the other. The centres of the brake toroids are in the manner previously described vented to the atmosphere, the venting ducts 117 connecting with suitable piping leading to reservoir 6. The venting of the centres of the brake toroids prevents the build up of back pressure within the brake during filling and more importantly sets the inlet pressure of the brakes at a fixed value during normal operation of the brakes 1 and 2, so that as will be described braking torque is directly related to the set pressure in reservoir 3.

Valves 9 and 10 serve to connect or cut-off the pressurised reservoir 3 from the brake feed lines. They are operated by application of pressure from the air reservoir 12 and have a spring return to the brake cut-off position.

Valve 13 is controlled by a pressure corresponding to that applied to reservoir 3, and is arranged to release valves 9 and 10, and therefore cut-off the flow of working fluid to the brakes 1 and 2 when the brake reservoir pressure 3 is below that corresponding to the minimum required braking torque. Valve 14 is also arranged to cut-off the flow of working fluid to the brakes 1 and 2 but is is operated by a solenoid which is energised by a signal generated when the vehicle speed is below the minimum at which the hydrokinetic brakes 1 and 2 can make a significant contribution to the braking effort. Valve 14 has operating solenoid 43 energised via lines 45. Changeover valve 15 is set by the direction of travel of the vehicle, and is arranged to close the valve 9 or 10 and allow flow of working fluid into the appropriate brake. It is solenoid operated via lines 46 including changeover switch 47.

The pressure within the reservoir 3 is controlled by means of the pressure regulating valve 16, which admits air from the pressurised air reservoir 12 when required. The air pressure acts directly on the working fluid in reservoir 3 and not through a diaphragm or the like. The setting of the pressure regulating valve 16 is by means of a proportional solenoid 17 through a mechanical linkage 18. The control of solenoid 17 is by a brake rate demand signal fed from the driver's control unit to the solenoid 17 through lines 19. The operation of the linkage 18 is influenced by jack 20, the position of which depends upon the vehicle suspension pressure (i.e., the axle loading of the vehicle). The jack 20 operates in such a manner as to result in the braking torque produced being sufficient to provide, whatever the axle loading of the vehicle, a retardation corresponding to the demand represented by the electrical input to the proportional solenoid 17.

The output displacement of the proportional solenoid 17 is proportional to the magnitude and direction of the current input to it. It is arranged that for zero current input, the pressure regulating valve 16 is set to give a pressure in reservoir 3 which produces a predetermined braking rate, so that upon failure of the electrical control solenoid 17, the brakes will be applied. A current input in one direction, of a value dependent upon the required retardation rate, will reduce the reservoir pressure and so decrease the torque to below the fail safe braking rate to the level required. When the current is such that the reservoir pressure falls below a predetermined value, pressure operated valve 13 will close, cutting off the flow of working fluid to the brake by closing the valve 9 or 10. Reversal of the polarity of the input current will increase the reservoir pressure to a value sufficient to give emergency stop braking.

The pressure in the air reservoir 12 is maintained by the compressor 22 and is controlled by relief valve 23. The compressor 22 may comprise the central compressor on a railway train so that the reservoir 12 is in fact connected to the normal air line on the train.

The energy absorbed during braking is removed as a temperature rise in the working fluid flowing through the brake. This is dissipated by passing the fluid, by means of a pump 24 through a subsidiary cooling circuit 25. This circuit also contains an ejector pump 26 which, when the brakes are off, is arranged via line 27 to reduce the air pressure within the brakes and so reduce parastitic drag. When the brakes are on, the pump 26 returns to the reservoir 3 oil from the reservoir 6 which may have escaped through the vent lines, thus maintaining the fluid level in the reservoir 3. The changeover between these two functions is performed by valve 28 which is pressure operated and operates with the brake on/off valves 13 and 14. A solenoid operated valve 29 operated by a temperature sensor within the brake reservoir 3 is arranged to by-pass the oil cooler when the reservoir oil temperature is sufficiently low.

Referring particularly to FIG. 6 the operation of the control system for the hydrokinetic brake will now be described.

As is well known a hydrokinetic brake converts kinetic energy into heat which is generated in the working fluid of the brake. The working fluid introduced into the toroid is forced into vortex rotation with a hollow core. An important characteristic of the brake which has been confirmed by experiment is that the torque produced is proportional to the pressure rise between the centre of the toroid and the periphery of the toroid, i.e. effectively between the inlet and outlet of the brake. The braking torque can therefore be controlled by regulating the outlet pressure provided the inlet pressure is maintained constant. This is achieved in the manner previously described by venting the toroid core to atmosphere. With this venting arrangement it has been found that working fluid does not flow out along the vent line, but on the contrary a very small amount of air is drawn into the vortex core through the venting arrangement. This air is digested by the brake without serious consequence.

With the inlet to the brake vented to atmosphere, so that the inlet is maintained at a constant pressure, a constant flow of fluid is achieved. Continuity dictates that the same flow must leave the brake as enters it, so that there is a constant pressure drop in the return line from the brake to the reservoir. Hence a fixed relationship is established between the reservoir pressure and the brake outlet pressure. Therefore regulation of the pressure setting of the reservoir 3 by adjustment of control valve 16 will result in a related outlet pressure at the brake and hence a related braking torque irrespective of the speed at which the brake is rotating. For example if the pressure drops across the inlet and outlet lines to the brake is the same, since the brake inlet is at atmospheric pressure, the brake outlet pressure will be twice the set reservoir pressure.

FIG. 7 shows a graph of the experimental results achieved for brake outlet pressure against braking torque.

As previously explained the two relevant pressure points within the brake are the centre of the toroid and the periphery of the toroid. In order to avoid complications therefore it is very advantageous to vent the centre of the toroid. The venting can however be at other points providing that between the chosen venting point and the centre of the toroid a varying pressure drop is not introduced.

At low speeds the hydrokinetic brake becomes incapable of providing all the required torque and the pressure rise across it falls. The vortex core then fills and fluid pressure appears at the vents. Simultaneously the inlet pressure to the brake rises and the outlet pressure falls. It can be shown that this pressure at the vents and the pressure changes at the inlet and outlet of the brake are proportional to the deficiency between demanded and actual torque. Each of them can therefore be used as a control parameter in similar manner to control actuation of friction brakes to supplement the braking torque.

To avoid repetition of description only the system which uses the outlet pressure of the hydrodynamic brake as control parameter will be described. The corresponding control systems using the other two varying pressures as control parameters will be abundantly obvious to persons reasonably skilled in the art.

The fluid pressure produced at the outlet from the hydrokinetic brakes is connected via line 30 to one end, and the reservoir pressure via line 31 to the other end of the jack 32 which controls, through a mechanical linkage 33, the setting of pressure regulating valve 34. Jack 32 therefore compares the hydrokinetic braking torque being produced, represented by the brake outlet pressure, with the braking torque requirement, represented by the reservoir pressure. Any deficiency in the torque produced results in a change in the setting of the valve 34.

The valve 34 is included in the fluid supply circuit for mechanical brake actuating jacks 35 and 36, the circuit being pressurised from the reservoir 37 by pump 38. The pressure regulating valve 34 controls the pressure applied to the jacks 35 and 36. When the hydrokinetic brakes are producing the braking torque demanded, the setting of the valve 34 is such that insufficient pressure is available for operation of the mechanical brakes. However, when the hydrokinetic braking torque falls below the demand, the setting of the valve 34 is altered to produce sufficient oil pressure to operate the mechanical brakes 39 and 40 to the required extent.

Valve 41 is provided to cut off the pressure supply to and therefore release, or prevent the application of, the mechanical brakes 39 and 40. When valve 13 is open (i.e. there is a braking demand), the valve 41 is opened by application of pressure, thus allowing application of the mechanical brake if a demand is indicated by jack 32. When valve 13 is closed, valve 41 is closed by a spring thus ensuring that the mechanical brakes are cut off when there is no braking demand. The valve 41 can also be closed by a solenoid 42 which is energised when conditions are unsuitable for operating the mechanical brake (e.g. when the vehicle speed is above an upper limit for safe operation of the brake or when a temperature sensor on the brake shoes indicates that their temperature has exceeded a safe maximum value).

A wheelslide signal is arranged to energise solenoids 43 and 42 thereby cutting off both hydrokinetic and mechanical brakes by operation of valves 14 and 41 until the wheelslide has disappeared.

As previously stated, a single, double-toroid brake may be used, one toroid being effective for one direction of rotation and the other for the other direction of rotation by opposite inclination of the rotor and stator vanes of the two toroids as previously described. The fluid connections within the brake can then be shown diagrammatically in FIG. 5.

The venting lines 121 and 122 vent the centres of the toroids as previously described. The working fluid supply line 124 branches to the centres of the two toroids via one-way valves 160 and 161 and the peripheries of the two toroids, which are inter-connected by lines 118 and 119, connect to line 125 which serves as an exit line. The one-way valves 160 and 161 prevent reverse flows between the two toroids.

We claim:

1. A method for controlling a brake system embodying a hydrokinetic brake of the type having a rotor and a stator together defining a toroid and also having inlet and outlet ports for liquid flowing continually through the brake during brake application from said inlet port to said outlet port, comprising the steps of:

maintaining for each desired braking torque an essentially constant flow of said liquid into said inlet port from a liquid reservoir, said essentially constant flow being independent of the speed of rotation of said rotor;

conveying said liquid from said outlet port to said liquid reservoir;

controlling the braking torque of said brake essentially independently of the speed of rotation of said rotor by setting the pressure acting on said liquid reservoir in accordance with the desired braking torque;

maintaining the pressure at said inlet port at a fixed pressure which is lower than the pressure in said reservoir, said fixed pressure being independent of the desired braking torque and the speed of rotation of said rotor.

2. A method according to claim 1, wherein said liquid is conveyed from said outlet to said reservoir through a closed conduit exhausting to the pressure acting on said reservoir.

3. A method according to claim 1, wherein said fixed pressure is maintained substantially at the center of said toroid, said fixed pressure being atmospheric pressure.

4. A method according to claim 1, wherein said brake system further embodies mechanical braking means, further comprising the steps of:

comparing the pressure at a point in a line connecting with the interior of said hydrokinetic brake with the pressure in said reservoir; and applying said mechanical braking means when a predetermined ratio is achieved for said compared pressures.

5. A method according to claim 4, further comprising the step of increasing the braking torque of said mechanical braking means as the ratio of said compared pressures continues to vary beyond said predetermined ratio.

6. A control system for a hydrokinetic brake, said brake having a rotor and a stator together defining a toroid and also having an inlet port and an outlet port for liquid flowing continually through the brake from said inlet port to said outlet port during brake application, comprising:

a liquid reservoir;

first means for selectively setting the pressure in said reservoir in accordance with the desired braking torque;

second means for conveying liquid at an essentially constant flow rate, in accordance with the pressure selected by said first means, from said reservoir to said inlet port during brake application, said second means conveying liquid at different, substantially constant flow rates for each desired braking torque irrespective of the speed of rotation of said rotor;

third means for constantly maintaining the pressure at said inlet port at a fixed pressure which is lower than the pressure in said reservoir during brake application; and fourth means for continually conveying liquid from said outlet port to said reservoir during brake application.

7. A control system according to claim 6, wherein said fourth means comprises a closed line exhausting to the pressure acting on said reservoir.

8. A control system according to claim 6, wherein said third means vents the center of said toroid to atmosphere.

9. A control system according to claim 6, further comprising:

fifth means for mechanical braking;

sixth means for comparing the pressure at a point in a line connecting with the interior of said hydrokinetic brake with the pressure in said reservoir; and seventh means responsive to the attainment of a predetermined ratio of compared pressures as a result of the variation in the pressure at said fixed point for applying said means for mechanical braking.

10. A control system according to claim 9, wherein said means for mechanical braking are applied by said seventh means to exert an increasing braking torque as said ratio of compared pressures continues to vary beyond said predetermined ratio.

* * * * *